(12) United States Patent
Choi et al.

(10) Patent No.: US 9,018,291 B2
(45) Date of Patent: Apr. 28, 2015

(54) POLYALKYLENE CARBONATE DIOL PAINT COMPOSITION

(71) Applicant: SK Innovation Co., Ltd., Seoul (KR)

(72) Inventors: Ji Yeon Choi, Daejeon (KR); Seung Gweon Hong, Daejeon (KR); Yong Gu Lee, Gunpo-si (KR); Gyu Hoe Kim, Gunpo-si (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 14/189,188

(22) Filed: Feb. 25, 2014

(65) Prior Publication Data

US 2014/0243463 A1    Aug. 28, 2014

(30) Foreign Application Priority Data

Feb. 26, 2013 (KR) .................. 10-2013-0020500
Feb. 18, 2014 (KR) .................. 10-2014-0018616

(51) Int. Cl.
*C09D 169/00* (2006.01)

(52) U.S. Cl.
CPC .................................. *C09D 169/00* (2013.01)

(58) Field of Classification Search
USPC .................................. 524/361; 525/439, 450
See application file for complete search history.

(56) References Cited

U.S. PATENT DOCUMENTS 4,946,884 A * 8/1990 Kuphal et al. .................. 524/403
2014/0377552 A1 * 12/2014 Kurata et al. .................. 428/354

FOREIGN PATENT DOCUMENTS

| JP | 2006-169444 | * | 6/2006 |
| KR | 20090090154 | A | 8/2009 |
| KR | 20100013255 | A | 2/2010 |
| KR | 20100067593 | A | 6/2010 |
| KR | 20080015454 | A | 9/2010 |

* cited by examiner

*Primary Examiner* — Robert D. Harlan
(74) *Attorney, Agent, or Firm* — The Webb Law Firm

(57) ABSTRACT

Disclosed is a polyalkylene carbonate paint composition, which is a pre-coated metal (PCM) paint composition capable of being applied in various fields for architectural uses, domestic uses, coating a can, or the like, in which high hardness is required. The composition may provide a PCM paint capable of having a low smoke density and significantly decreasing discharge of toxic gas and smoke caused by combustion at the time of fire as compared to the existing laminate steel sheet and high gloss film. In addition, disclosed is a high hardness paint composition capable of being usefully used in a PCM print steel sheet applied to electric home appliances due to an excellent adhesion property to a metal material and excellent durability.

16 Claims, No Drawings

POLYALKYLENE CARBONATE DIOL PAINT COMPOSITION

CROSS-REFERENCE TO RELATED APPLICATIONS

This application claims priority to Korean Patent Application No. 10-2013-0020500, filed Feb. 26, 2013 and No. 10-2014-0018616 filed Feb. 18, 2014, the disclosures of which are hereby incorporated in their entirety by reference.

TECHNICAL FIELD

The following disclosure relates to a polyalkylene carbonate diol paint composition.

BACKGROUND

A domestic steel sheet according to the related art was manufactured by post-processing a pre-coated metal (PCM) steel sheet or processing a steel sheet and then powder-painting the processed steel sheet. However, in accordance with the recent trend toward quality enhancement of electric home appliances, in the existing single colored PCM and powder-painting panel, implementation of a differential color and various glosses has been demanded. Therefore, a PCM laminating method using an ink printing has been used.

A laminate attached to the steel sheet by the PCM laminating method has an excellent gloss as compared to a paint painting system, and a separate ink printing process is not required. However, since the laminate is attached by only an adhesive, there are many problems such as poor adhesion with a material, deterioration of corrosion resistance, water resistance, and durability, and the like, as compared to the paint.

In addition, the laminate, which is a film having a thickness of 150 to 160 μm, has a thickness thicker than that of a coating-film of the paint, and a cost for quality enhancement may be excessively increased.

Further, since ink is already printed on a laminate film itself, it may be difficult to independently control a design in painting and electric home appliance companies. Further, at the time of fire, additional damages due to toxic gas poisoning or a large amount of smoke may be increased.

Among these problems, in order to satisfy the quality enhancement of a customer, painting using a 4-coating 3-baking system in which a painting equipment capable of performing the ink-printing on a painting line is provided and a transparent paint is painted by a wet-on-wet method has been attempted. In this ink-printing system, thin-film painting may be performed as compared to the laminate film, physical properties of a coating-film may be improved and economical efficiency may be obtained by a under coating paint-base paint-ink-transparent paint system. However, in the case of using to the existing resin in the above-mentioned method, it may be difficult to achieve low smoke density, a paint adhesion property, durability, and the like.

Meanwhile, an aliphatic polycarbonate resin is an eco-friendly material applied in various fields due to excellent processability and biodegradability. However, since the aliphatic polycarbonate resin has low elasticity and may be easily broken, there is a limitation in applying the aliphatic polycarbonate resin. Therefore, a technology of blending the aliphatic polycarbonate resin with various resins to improve heat resistance or mechanical properties has been required.

For example, a resin composition containing polypropylene carbonate melt-mixed with polymethyl methacrylate (PMMA) or a binder for a forming process of ceramics or metal powder has been disclosed in U.S. Pat. No. 4,946,884, but there is a limitation in improving physical properties only by blending polypropylene carbonate with a heterogeneous resin.

An interpenetrating polymer network (IPN) is a multi-component system polymer in which at least one component has a cross-linking structure and at least one component is polymerized or cross-linked in the presence of another component, such that polymer chains are interpenetrated into with each other. In the IPN, since a polymer chain degree is large due to the cross-linked structure, phase separation frequently generated in a polymer blend may be suppressed, and the IPN has a dual phase continuity structure in which two components form continuity, such that various physical properties may be improved.

Therefore, a technology of applying an IPN structure for applying a polypropylene carbonate resin to a PCM laminate film and overcoming limitation of the PCM laminate film to further increase an application range has been demanded.

SUMMARY

An embodiment of the present invention is directed to providing an eco-friendly polyalkylene carbonate paint composition capable of hardly generating smoke or toxic gas at the time of combustion and significantly improving mechanical properties and durability through high density cross-linking.

In addition, an embodiment of the present invention is directed to providing a polyalkylene carbonate paint composition capable of having excellent adhesive force with a metal, exhibiting equivalent or more excellent coating-film performance while having a thin thickness as compared to a PCM paint according to the related art, and having excellent economic efficiency.

In general aspect, a polyalkylene carbonate paint composition contains:

(a) a polyalkylene carbonate diol resin having an OH value of 3 to 10 mgKOH/g and a weight average molecular weight (MW) of 1,000 to 30,000 g/mol;

(b) a polyol compound having an OH value of 51 to 61 mgKOH/g and a weight average molecular weight (MW) of 200 to 300,000 g/mol;

(c) a curing agent;

(d) a curing catalyst; and (e) an organic solvent.

A weight mixing ratio of (a) the polyalkylene carbonate diol resin and (b) the polyol compound may be 65:35 to 95:5.

The curing agent may be any one or more selected from polyamine based compounds and polyisocyanate based compounds.

0.1 to 30 weight % of the curing agent and 0.01 to 0.5 weight % of the curing catalyst may be contained in the entire composition.

The curing catalyst may be any one or more selected from dodecyl benzene sulfonic acid, dibutyl tin dilaurate, p-toluene sulfonic acid, dinonyl naphthalene sulfonic acid, and dinonyl naphthalene disulfonic acid.

The polyalkylene carbonate paint composition may further contain any one or more selected from an inorganic filler formed of calcium carbonate, magnesium carbonate, calcium sulfate, magnesium sulfate, zinc oxide, magnesium oxide, aluminum oxide, calcium oxide, titanium oxide, calcium hydroxide, magnesium hydroxide, aluminum hydroxide, microcrystalline silica, fumed silica, natural zeolite, synthetic zeolite, bentonite, and clay; an acrylic dispersant; a silicone based defoamer; and a pigment.

The polyalkylene carbonate paint composition may further contain any one or at least two additives selected from a dye, an anti-oxidant, a sunscreen agent, an anti-static agent, an anti-blocking agent, a slip agent, a mixing agent, a stabilizer, a tackifier resin, a fluorescent whitening agent, a heat stabilizer, a photo-stabilizer, an ultraviolet absorber, and a lubricant.

DETAILED DESCRIPTION OF EMBODIMENTS

Hereinafter, a polyalkylene carbonate paint composition will be described in detail. The exemplary embodiments of the present invention to be described below are provided by way of example so that the idea of the present invention can be sufficiently transferred to those skilled in the art to which the present invention pertains. Here, technical terms and scientific terms used in the present specification have the general meaning understood by those skilled in the art to which the present invention pertains unless otherwise defined, and a description for the known function and configuration obscuring the present invention will be omitted in the following description.

The present inventors studied in order to develop an eco-friendly paint composition capable of having low smoke density, preventing generation of toxic gas, implementing excellent mechanical properties, processability, durability, color implementing property, gloss property, and solvent resistance. As a result, the present inventors found that in the case of mixing a polyalkylene carbonate diol resin and a polyol compound and containing a curing agent, a curing catalyst, and a solvent while adjusting OH values and weight average molecular weights of these compounds simultaneously with a mixing ratio, adhesive force with a metal may be strengthened, and coating film hardness, impact strength, and a delamination property may be significantly improved as well as the above-mentioned effects, thereby completing the present invention.

A polyalkylene carbonate paint composition according to an exemplary embodiment of the present invention may contain: a) a polyalkylene carbonate diol resin having an OH value of 3 to 10 mgKOH/g and a weight average molecular weight (MW) of 1,000 to 30,000 g/mol; b) a polyol compound having an OH value of 51 to 61 mgKOH/g and a weight average molecular weight (MW) of 200 to 30,000 g/mol; c): a curing agent; d) a curing catalyst; and e) an organic solvent.

In the present invention, the polyalkylene carbonate diol resin is used as a main resin, and the polyol compound is used as an auxiliary resin, such that compatibility may be increased, and a rapid and efficient curing reaction may be induced. Particularly, the polyalkylene carbonate paint composition has an interpenetrating polymer network (IPN) structure due to a difference in curing reaction rate, such that cross-link density may be improved, and thus, physical properties may be improved.

In the present invention, as the polyalkylene carbonate, polyalkylene carbonates filed by SK Innovation Co., (Korean Patent Laid-Open Publication No. 2008-0015454, No. 2009-0090154, No. 2010-067593, and No. 2010-0013255) may be used.

The polyalkylene carbonate may be prepared by a copolymerization reaction of carbon dioxide and at least one epoxide compound selected from a group consisting of (C2-C20)alkyleneoxide substituted or unsubstituted with halogen, (C1-C20)alkyloxy, (C6-C20)aryloxy, or (C6-C20)ar(C1-C20)alkyl(aralkyl)oxy; (C4-C20)cycloalkyleneoxide substituted or unsubstituted with halogen, (C1-C20)alkyloxy, (C6-C20)aryloxy, or (C6-C20)ar(C1-C20)alkyl(aralkyl)oxy; and (C8-C20)styreneoxide substituted or unsubstituted with halogen, (C1-C20)alkyloxy, (C6-C20)aryloxy, (C6-C20)ar(C1-C20)alkyl(aralkyl)oxy, or (C1-C20)alkyl.

Preferably, the polyalkylene carbonate may be polypropylene carbonate. In the polypropylene carbonate, which is synthesized by a reaction of carbon dioxide and propylene oxide, carbonate from carbon dioxide and propylene oxide are cross-linked to each other, and as a result of nuclear magnetic resonance (NMR) analysis, an ether linkage to which propylene oxide is linked may account for 3 mole % or less.

In the present invention, the polyalkylene carbonate diol resin may have a weight average molecular weight of 1,000 to 30,000 g/mol. In the case in which the weight average molecular weight of the polyalkylene carbonate diol resin is less than 1,000 g/mol, impact resistance, durability, and mechanical strength may be decreased, and in the case in which the weight average molecular weight thereof is more than 35,000 g/mol, dispersability, the gloss property, and solvent resistance may be deteriorated, and the curing reaction may not be smoothly carried out.

The polyalkylene carbonate diol resin, which is the main resin of the present invention, has physical properties such as excellent mechanical strength and processability, and the like. However, since the OH value of the polyalkylene carbonate diol resin is too low to allow the IPN reaction to be sufficiently carried out to increase the cross-link density, the polyol compound is mixed as the auxiliary resin, such that the IPN reaction allowing the polyalkylene carbonate paint composition to have the IPN structure may be effectively carried out.

The polyol compound may have a weight average molecular weight of, preferably 200 to 30,000 g/mol, more preferably 15,000 to 25,000 g/mol.

As the polyol compound, any one or more selected from a group consisting of polyester polyol, polyether polyol, and polycarbonate polyol may be used.

In the present invention, a preferable polyol compound may be polycarbonate diol resin.

The polyol compound may have an OH value of 51 to 61 mgKOH/g, and an acid value of 0.5 mgKOH/g or less. In this case, a weight mixing ratio of the polyalkylene carbonate diol resin and the polyol compound may be 65:35 to 95:5 in order to improve a degree of cure, a gloss property, mechanical properties, processability, economical efficiency, and the like. The weight mixing ratio may be preferably 70:30 to 95:5, more preferably 80:20 to 95:5. The weight mixing ratio may be adjusted according to the selected physical properties.

In the present invention, a preferable glass transition temperature of the polyalkylene carbonate may be 30 to 40° C. When the glass transition temperature is out of the above-mentioned range, processability or hardness of the coating film may be deteriorated.

In addition, a content of the polyalkylene carbonate in the entire paint composition may be 25 to 65 weight %. In the case in which the content of the polyalkylene carbonate is less than 25 weight %, since it may be difficult to adjust a thickness of the coating film at the time of performing a painting process, the painting may be thinly performed, such that paintability of the paint may be deteriorated, and in the case in which a pigment is present, adhesive force of the pigment may be decreased. Further, in the case in which the content is more than 65 weight %, it may be difficult to adjust a viscosity at the time of performing the painting process, smoothness and a defoaming property may be deteriorated, and popping, or the like, may be generated.

In the present invention, the curing agent may include any one or more selected from polyamine based compounds and polyisocyanate based compounds.

It is preferable that the polyamine based compound is a melamine based compound. An example of the melamine based compound may include hexa methoxy methyl melamine, hexa ethoxy methyl melamine, hexa propoxy methyl melamine, hexa butoxy methyl melamine, hexa pentyl oxy methyl melamine, hexa hexyl oxy methyl melamine, and the like, but is not necessarily limited thereto.

An example of polyisocyanate based compound may include 2,4-trilene diisocyanate, 2,6-trilene diisocyanate, hydrogenated trilene diisocyanate, 1,3-xylene diisocyanate, 1,4-xylene diisocyanate, diphenyl methane-4,4-diisocyanate, 1,3-bisisocyanatemethyl cyclohexane, tetra methyl xylene diisocyanate, 1,5-naphthalene diisocyanate, 2,2,4-trimethyl hexamethylene diisocyanate, 2,4,4-trimethyl hexamethylene diisocyanate, triphenylmethanetriisocyanate, or the like, but is not necessarily limited thereto.

In the present invention, the curing agent may impart mechanical properties including the coating film hardness and durability and according to the selected curing agent, a use amount of the curing agent may be adjusted. Preferably, a content of the curing agent may be 0.1 to 30 weight % based on the entire paint composition. For example, in the case of using butylated melamine formaldehyde resin, the use amount thereof may be 2 to 20 weight %, and in the case of using a hexamethylene diisocyanate trimer, the use amount may be 0.5 to 5 weight %.

In this case, preferably, the polyamine based compound and the polyisocyanate based compound may be simultaneously reacted in order to form the IPN structure of the resin, but may be sequentially reacted.

The solvent used in the present invention may include a solvent capable of dissolving polyalkylene carbonate. The solvent is not particularly limited as long as the solvent does not dissolve a resin of ink contained in a base applied to a wet-on-wet system. For example, ketone, ether, ester, alcohol, or the like, may be used. More specifically, propylene glycol monomethyl ether acetate (PMA), methyl ethyl ketone (MEK), or the like, may be used. In this case, a content of the solvent may be suitably adjusted, but preferably, PMA and MEK may be mixed at a volume ratio of 0.5 to 1.5:1 and used. More preferably, PMA and MEK may be mixed at a volume ratio of 0.8 to 1.2:1 and used, and the solvent may be used in a range of 0.5 to 70 weight % based on the entire weight of the composition.

In the present invention, the curing catalyst may be contained together with the curing agent and used. For example, as the curing agent, diisocyanate and the butylated melamine formaldehyde resin may be used. In this case, any one or at least two curing catalyst selected from dodecyl benzene sulfonic acid, dibutyl tin dilaurate (DBTDL), p-toluene sulfonic acid, dinonyl naphthalene sulfonic acid, and dinonyl naphthalene disulfonic acid may be used. In this case, 0.01 to 0.5 weight % of the curing catalyst may be used based on the entire weight of the composition.

A polypropylene carbonate paint composition according to an exemplary embodiment of the present invention may further contain any one or at least two additives selected from a pigment; an inorganic filler selected from calcium carbonate, magnesium carbonate, calcium sulfate, magnesium sulfate, zinc oxide, magnesium oxide, aluminum oxide, calcium oxide, titanium oxide, calcium hydroxide, magnesium hydroxide, aluminum hydroxide, microcrystalline silica, fumed silica, natural zeolite, synthetic zeolite, bentonite, and clay; an acrylic dispersant; and a silicone based defoamer.

As the pigment, any one selected from titanium dioxide, cyan blue, magenta, a yellow pigment, and a mixture thereof may be used. A content of the pigment may be in a range of 0.1 to 30 weight % based on the entire weight of the composition.

According to the present invention, in order to stabilize the pigment and increase dispersability, the inorganic filler such as clay, for example, organo clay, or the like, or humed silica, or the like, may be used. A content of the inorganic filler may be 0.001 to 5 weight %, preferably 0.01 to 2 weight % based on the entire weight of the composition. In this case, the inorganic filler may impart a matte effect, or the like, while maintaining other physical properties. In addition, the composition may further contain a dispersant, a leveling agent, a coloring agent, an anti-precipitation agent, an anti-sagging agent, and the like, and contents thereof may be 0.01 to 5 weight %, respectively.

In the present invention, in order to improve the smoothness and defoaming property, any one or more selected from acrylic compounds, vinyl based compounds, and silicon based compounds may be further contained. For example, there are 143, 356, 410, 2163, and 2105 made by BYK company, and the like. Particularly, in the composition according to the present invention, in the case of containing an acrylic modified polyester resin, smoothness, the defoaming property, the gloss property, and film formability may be significantly improved. Further, the composition according to the present invention has excellent solvent power in order to secure smoothness and increase the gloss property of the paint. For example, a PMA-MEK solvent system has excellent solvent power for a polyalkylene carbonate resin, such that smoothness of the paint may be excellent, and dispersion stability of inorganic pigment particles may be increased. In this case, in order to increase stability of pigments, 0.001 to 5 weight % of clay or fumed silica may be used, but the present invention is not necessarily limited thereto.

It is preferable that the polyalkylene carbonate paint composition is baked at 180 to 280° C. for 10 seconds to 1 minute.

Further, in the present invention, in order to selectively improving physical properties, any one or at least two additives selected from a dye, an anti-oxidant, a sunscreen agent, an anti-static agent, an anti-blocking agent, a slip agent, a mixing agent, a stabilizer, a tackifier resin, a fluorescent whitening agent, a heat stabilizer, a photo-stabilizer, an ultraviolet absorber, and a lubricant, may be further contained.

In addition, the present invention may provide a shaped body containing the above-mentioned polyalkylene carbonate diol paint composition.

Hereinafter, the present invention will be understood and appreciated more fully from the following Examples, and the following Examples are for illustrating the present invention and not for limiting the present invention.

Example 1

70 parts by weight of polypropylene carbonate diol (PPC diol) having a weight average molecular weight of 25,000 g/mol, including hydroxyl groups at both ends of a molecular chain, and having a glass transition temperature of 35° C. and 150 parts by weight of a solvent obtained by mixing cyclo hexane and methyl ethyl ketone (MEK) at a weight ratio of 1:1 were put into a metal can and stirred, thereby obtaining a mixed solution. After 100 parts by weight of titanium dioxide was slowly put into the mixed solution while stirring the mixed solution, a glass bead having a diameter of 2 to 3 mm was put thereinto and the mixture was dispersed for 1 hour using a crusher type dispersion apparatus. In this case, an average particle size was measured using a grind gage and adjusted so as to be 5 μm or less. 20 parts by weight of a polycarbonate diol (PCDL) resin, 20 parts by weight of melamine, and 10 parts by weight of the solvent obtained by mixing cyclo hexane and methyl ethyl ketone (MEK) at a weight ratio of 1:1 were added to the dispersion and stirred. Further, 0.1 part by weight of BYK-180 was added thereto as an additive for dispersion stability and stirred. Next, 0.5 parts by weight of p-toluene sulfonic acid and 0.5 parts by weight of dodecylbenzene sulfonic acid were slowly added thereto as curing catalysts, thereby preparing a polypropylene carbonate paint composition.

Before painting, the paint composition was diluted with PMA to the painting viscosity (Ford cup No. 4, for 80 seconds at 25° C.)

The diluted PPC paint composition was painted using a bar-coater as a top-coating paint so as to have a thickness of 15 μm onto a galvanized (GI) steel sheet (0.4 T) on which an epoxy type under paint was painted at a dried coating thickness of 5 μm, then baked at 224° C. for 30 seconds, thereby manufacturing a sample for testing physical properties.

Results obtained by testing physical properties of the coating film were shown in the following Table 1.

Example 2

A paint composition was prepared by the same method as that in Example 1 except for adjusting contents of the polypropylene carbonate diol resin, polycarbonate diol, and melamine to 65 parts by weight, 30 parts by weight, and 15 parts by weight, respectively.

Example 3

A paint composition was prepared by the same method as that in Example 1 except for adjusting contents of the polypropylene carbonate diol resin, polycarbonate diol, and melamine to 75 parts by weight, 25 parts by weight, and 15 parts by weight, respectively.

Example 4

A paint composition was prepared by the same method as that in Example 1 except for adjusting contents of the polypropylene carbonate diol resin, polycarbonate diol, and melamine to 70 parts by weight, 40 parts by weight, and 20 parts by weight, respectively.

Example 5

A paint composition was prepared by the same method as that in Example 1 except for adjusting contents of the polypropylene carbonate diol resin, polycarbonate diol, and melamine to 98 parts by weight, 2 parts by weight, and 20 parts by weight, respectively.

Example 6

A paint composition was prepared by the same method as that in Example 1 except for using polyester polyol instead of polycarbonate diol.

Example 7

A paint composition was prepared by the same method as that in Example 3 except for using polyester polyol instead of polycarbonate diol.

Comparative Example 1

A paint composition was prepared by the same method as that in Example 1 except for using polypropylene carbonate having a weight average molecular weight of 40,000 g/mole.

Comparative Example 2

A paint composition was prepared by the same method as that in Example 1 except for using the same amount of methylene diphenyl isocyanate (MDI) instead of melamine.

Comparative Example 3

A paint composition was prepared by the same method as that in Example 1 except for using the same amount of 2,4-diamino-6-phenyl-s-triazine instead of melamine.

TABLE 1

| | Example | | | | | | | Comparative Example | | |
|---|---|---|---|---|---|---|---|---|---|---|
| Classification | 1 | 2 | 3 | 4 | 5 | 6 | 7 | 1 | 2 | 3 |
| Appearance | Good | Good | Good | Good | Good | Good | Good | Good | Generation of Yellowing | Good |
| Gloss | 90 | 83 | 76 | 71 | 53 | 85 | 87 | 21 | 18 | 25 |
| Pencil Hardness | H | H | H | H | B | H | H | B | B | B |
| Impact (Crack, Delamination Observation) | Good | Good | Good | Good | Good | Good | Good | Crack | Crack | Crack |
| CCE adhesion (The Number of Delaminated Samples Among 100 Samples) | 0 | 0 | 2 | 3 | 10 | 0 | 0 | 30 | 20 | 15 |
| T-Bend Processability (2T 4 points or more) | 4 Points | 4 Points | 4 Points | 4 Points | 3 Points | 4 Points | 4 Points | 2 Points | 2 Points | 2 Points |
| MEK Rubbing | ≥100 Times | 90 Times | 80 Times | 65 Times | 35 Times | ≥100 Times | ≥100 Times | 18 Times | 7 Times | 11 Times |
| Non-volatile Component (%) | 49.2 | 50.4 | 46.9 | 47.1 | 49.8 | 47.8 | 49.4 | 42.9 | 47.3 | 47.7 |

As shown in Table 1, it may be appreciated that in the cases of Examples according to the present invention, the gloss property and processability were excellent, and durability may be improved due to excellent hardness, and impact and delamination properties. On the contrary, it may be appreciated that in the case of Comparative Example 1 in which the PPC resin having a large molecular weight was applied, the reactivity was low, and thus, hardness was decreased, such that physical properties were deteriorated.

Therefore, it was confirmed that the polypropylene carbonate diol paint composition according to the present invention has excellent compatibility, processability, gloss property, solvent resistance, coating film hardness, impact and delamination properties, and adhesion, such that the polypropylene carbonate diol paint composition may be used in various fields for domestic uses, and the like, as well as architectural uses.

The polyalkylene carbonate paint composition according to the present invention may have advantages in that the composition is an eco-friendly and has excellent compatibility, processability, and durability.

In addition, the polyalkylene carbonate paint composition may have advantages in that smoke density is low, toxic gas is hardly generated, and the composition may have excellent coating-film hardness, impact strength, and delamination property by significantly increasing mechanical properties through high density cross-linking, and have excellent adhesive force with a metal.

Further, the polyalkylene carbonate paint composition according to the present invention may implement an excellent color and have high gloss and excellent solvent resistance, or the like, such that the polyalkylene carbonate paint composition may be variously used in a PCM paint field for domestic uses in addition to architectural uses, an exterior material for a vehicle, and the like.

What is claimed is:

1. A polyalkylene carbonate paint composition comprising:
   (a) a polyalkylene carbonate diol resin having an OH value of 3 to 10 mgKOH/g and a weight average molecular weight (MW) of 1,000 to 30,000 g/mol;
   (b) a polyol compound having an OH value of 51 to 61 mgKOH/g and a weight average molecular weight (MW) of 200 to 30,000 g/mol;
   (c) a curing agent;
   (d) a curing catalyst; and
   (e) an organic solvent.

2. The polyalkylene carbonate paint composition of claim 1, wherein a weight mixing ratio of (a) the polyalkylene carbonate diol resin and (b) the polyol compound is 65:35 to 95:5.

3. The polyalkylene carbonate paint composition of claim 1, wherein the polyol compound is polycarbonate diol resin.

4. The polyalkylene carbonate paint composition of claim 1, wherein the curing agent is any one or more selected from polyamine based compounds and polyisocyanate based compounds.

5. The polyalkylene carbonate paint composition of claim 1, wherein 0.1 to 30 weight % of the curing agent and 0.01 to 0.5 weight % of the curing catalyst are contained in the entire composition.

6. The polyalkylene carbonate paint composition of claim 1, wherein the curing catalyst is any one or more selected from dodecyl benzene sulfonic acid, butyl tin dilaurate, p-toluene sulfonic acid, dinonyl naphthalene sulfonic acid, and dinonyl naphthalene disulfonic acid.

7. The polyalkylene carbonate paint composition of claim 1, further comprising any one or more selected from an inorganic filler formed of calcium carbonate, magnesium carbonate, calcium sulfate, magnesium sulfate, zinc oxide, magnesium oxide, aluminum oxide, calcium oxide, titanium oxide, calcium hydroxide, magnesium hydroxide, aluminum hydroxide, microcrystalline silica, fumed silica, natural zeolite, synthetic zeolite, bentonite, and clay; an acrylic dispersant; a silicone based defoamer; and a pigment.

8. The polyalkylene carbonate paint composition of claim 1, further comprising any one or at least two additives selected from a dye, an anti-oxidant, a sunscreen agent, an anti-static agent, an anti-blocking agent, a slip agent, a mixing agent, a stabilizer, a tackifier resin, a fluorescent whitening agent, a heat stabilizer, a photo-stabilizer, an ultraviolet absorber, and a lubricant.

9. A shaped body prepared from the polyalkylene carbonate paint composition of claim 1.

10. A shaped body prepared from the polyalkylene carbonate paint composition of claim 2.

11. A shaped body prepared from the polyalkylene carbonate paint composition of claim 3.

12. A shaped body prepared from the polyalkylene carbonate paint composition of claim 4.

13. A shaped body prepared from the polyalkylene carbonate paint composition of claim 5.

14. A shaped body prepared from the polyalkylene carbonate paint composition of claim 6.

15. A shaped body prepared from the polyalkylene carbonate paint composition of claim 7.

16. A shaped body prepared from the polyalkylene carbonate paint composition of claim 8.

* * * * *